Aug. 14, 1962
C. T. RASMUSSEN ETAL
3,048,933
CARRY TYPE SCRAPER
Filed Oct. 16, 1959
2 Sheets-Sheet 1
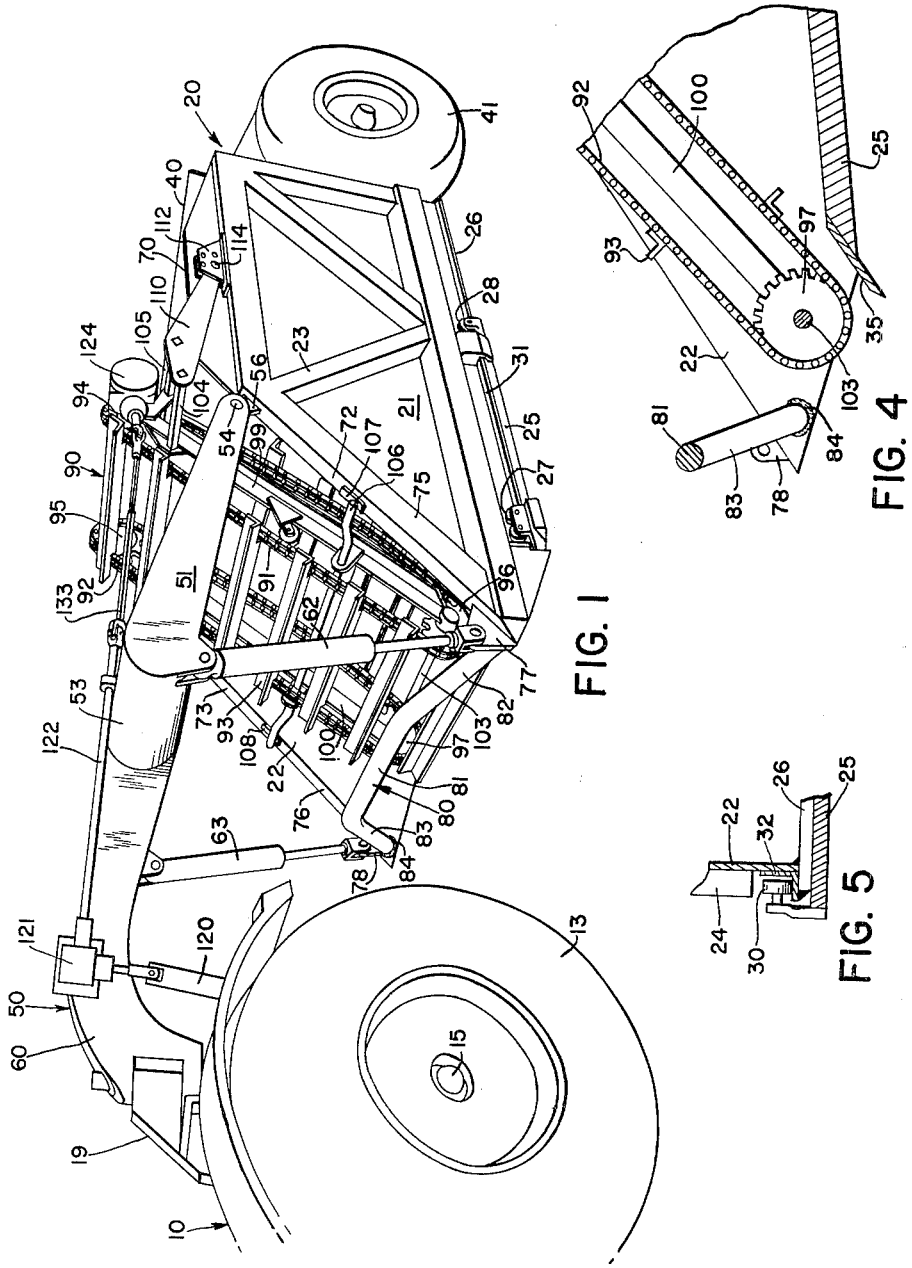
INVENTORS
CLARENCE T. RASMUSSEN,
JOHN H. CREIGHTON
BY C.T. Parker and W.A. Murray
ATTORNEYS Aug. 14, 1962  C. T. RASMUSSEN ETAL  3,048,933
CARRY TYPE SCRAPER
Filed Oct. 16, 1959
2 Sheets-Sheet 2
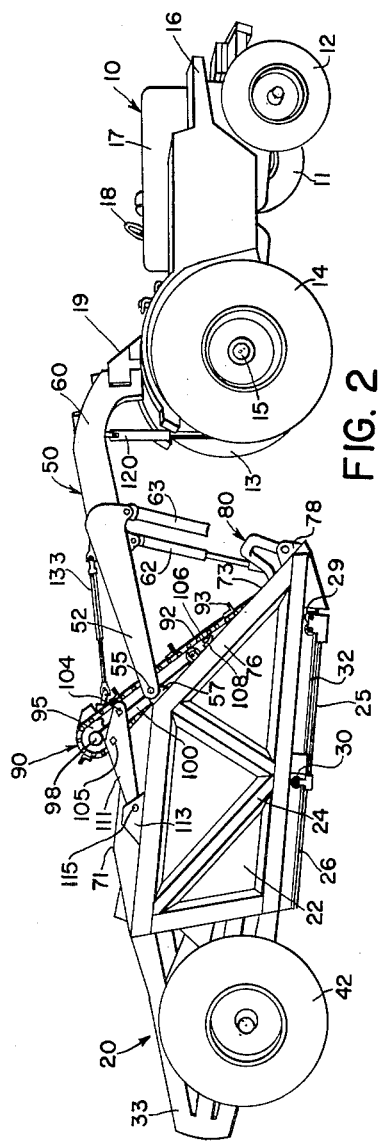
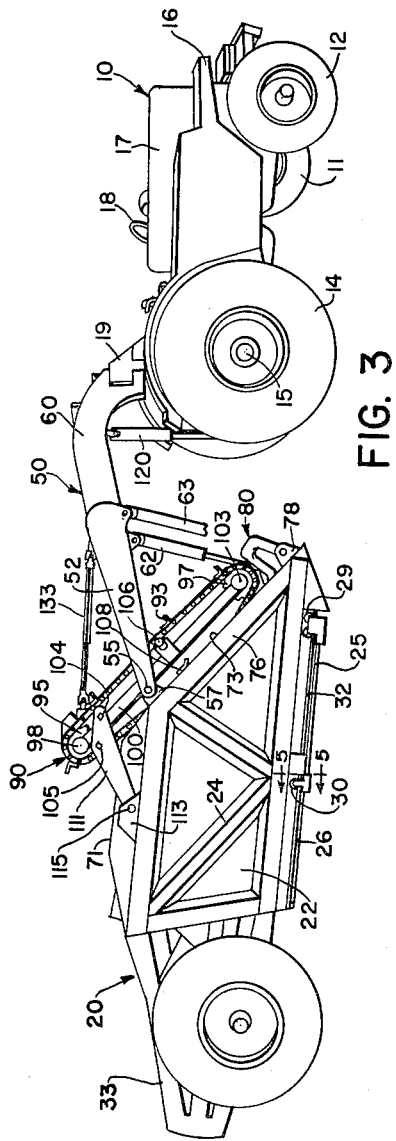
INVENTORS
CLARENCE T. RASMUSSEN,
JOHN H. CREIGHTON
ATTORNEYS

United States Patent Office 3,048,933
Patented Aug. 14, 1962

3,048,933
CARRY TYPE SCRAPER
Clarence T. Rasmussen, Moline, Ill., and John H. Creighton, Davenport, Iowa, assignors to Deere & Company, Moline, Ill., a corporation of Delaware
Filed Oct. 16, 1959, Ser. No. 847,007
7 Claims. (Cl. 37—129)

This invention relates to a combination tractor and carry-type scraper, the scraper being of the type having an elevator for moving dirt within the scraper bowl. Still more particularly this invention relates to a rather novel method of mounting the elevator on the bowl and a construction of the bowl which will add strength and rigidity to the bowl.

One of the more conventional type carry-type scrapers presently in use includes a fore-and-aft extending material carrying box or bowl having a forwardly positioned cutting edge. Normally the bowl is open to the forward end so that material may pass over the cutting edge into the rear portions of the bowl. The bowl is composed of transversely spaced side walls interconnected at their lower edges by a horizontally disposed floor. The floor is often composed of front and rear sections and provision is made for the front section to slide under the rear section for purposes of discharging material from the bowl. The bowl is conventionally carried on a pair of wheels positioned at the rear of the bowl. The forward end of the bowl is supported from the rear of the tractor by means of a beam structure having a pair of fore-and-aft extending and transversely spaced apart leg beams pivotally mounted at their rear ends to the sides of the bowl and interconnected at their forward ends by a cross beam. Centrally mounted on the cross beam and projecting forwardly therefrom is an integral rigid beam which extends forwardly to be mounted on a universal type hitch on the tractor. The vertical position of the forward cutting edge as well as the bowl is normally controlled by hydraulic units extending from the beam structure to the bowl. Also conventional in many types of scrapers is a forwardly positioned undershot elevator which is laterally disposed across the open forward end of the bowl and cooperates with the material passing over the cutting edge to aid in moving the material rearwardly in the bowl. An elevator of this nature normally is provided with mounting structure which permits floating action of the elevator over the dirt or material entering the bowl so that damage cannot be done to the elevator or cutting edge should a large stone or other foreign object be contacted by the scraper.

As may be readily apparent, there is an inherent weakness in this type of bowl since there exists no basic transverse rigid frame between the side walls at their forward ends. Particularly is this so when the floor is composed of a two-piece section with the forward section sliding under the rear section. With a bowl constructed in this manner, there exists no transverse framework between the side walls from the forward edge of the rear section of the floor to the forward end of the side walls. The problem arising which prevents positioning a transverse beam to interconnect the forward ends of the side walls is that there has heretofore considered to be no place to put such a beam. A transverse beam cannot be placed rather low and above the elevator since the elevator must be permitted relatively free vertical movement to permit stones or other large material to pass into the elevator. If the transverse beam is mounted extremely high in the bowl so as to be completely clear of the elevator, it then creates a problem of interference with the supporting beam structure extending to the tractor and also it loses its basic support for the lower edges of the sidewalls. If a transverse beam structure is placed forwardly of the bowl, there is then created a problem of interference when turning the tractor and the scraper.

It is proposed and it is the main object of the present invention to provide an arch member positioned adjacent to the lower forward end of the bowl and interconnecting the side walls of the bowl. In normal operation, the arch member will overlie the lower end of the elevator. The elevator will be mounted on the bowl structure by means of a pair of arms rigidly connected at their forward ends to the elevator and pivotally mounted at their rear ends to the side walls of the bowl. The arms will be of such length and will connect to the elevator at a suitable location whereby as the lower end of the elevator is raised by earth or stones to the height of the arch, the arms will effect movement of the elevator rearwardly so that the lower end will pass to the rear of the arch member.

Other objects and advantages of the invention will become apparent as the nature of the invention is better understood from the following description and as shown in the accompanying drawings.

FIG. 1 is a side and front perspective view of a rear portion of the tractor and the scraper.

FIG. 2 is a side perspective view of the tractor and scraper with the elevator in one position.

FIG. 3 is a side perspective view similar to FIG. 2 with the elevator in a raised or up position.

FIG. 4 is a longitudinal and vertical sectional view of the lower portion of the forward end of the scraper.

FIG. 5 is a sectional view taken substantially along the lines 5—5 of FIG. 3.

The tractor 10 has a pair of front steerable wheels 11, 12 and a pair of rear traction wheels 13, 14 carried on a transverse rear axle structure 15. The tractor 10 includes an elongated tractor body 16 with a forwardly disposed engine or main power source mounter under a hood 17. To one side of the engine hood or housing 17 is an operator's station, indicated in its location by the steering wheel 18. Supported by and formed above the tractor axle 15 is structure forming a universal hitch 19 for connection to the trailing type scraper implement, indicated in its entirety by reference numeral 20.

The scraper 20 is composed of an elongated dirt carrier or bowl formed by a pair of fore-and-aft extending upright side walls 21, 22. The side walls 21, 22 have superstructure or framework, such as at 23, 24, which form with other such framework a main frame for the implement. The side walls 21, 22 are interconnected at their lower edges by a horizontally disposed floor composed of a front section 25, and a rear section 26. The front section 25 is provided with rollers 27, 28 on its left, end and 29, 30 on its right end which ride on tracks 31, 32 on the left and right respectively of the side walls 21, 22 which permits the forward floor section 25 to recess or slide beneath the rear floor section 26. A hydraulically controlled linkage system, not shown, retained at the rear of the scraper bowl substantially in the location of the rearwardly projecting supporting frame 33 is provided to move the forward section 25 between its rearward and forward positions. The scraper supports a forward cutting blade 35 which is bolted to the forward end of the forward floor section 25.

The rear wall of the bowl is in the form of an ejector plate 40 which is movable forwardly by means of a lever and hydraulic system, not shown, but also contained under the rear framework 33. The rearwardly projecting framework 33 serves as part of the main frame for the scraper body and supports the scraper body at its rear end on wheels 41, 42. Generally, therefore, the bowl or body is filled by moving the cutting blade 35 and its associated floor section 25 into a position of contact with the ground to permit the ground or earth to pass over the blade 35 and into the forward open end of the body or bowl. For discharging the dirt or earth from the bowl or body, the front section 25 of the floor is drawn rearwardly and the ejector plate 40 is driven forwardly to drive the earth out of the forward half of the bowl and through the opening left by the floor 25.

The scraper bowl or body is connected to the tractor by means of the Y-shaped beam structure indicated in its entirety by the reference numeral 50. The latter structure includes a pair of transversely spaced leg portions 51, 52 interconnected at their forward ends by a transverse beam portion 53. The rear ends of the leg portions 51, 52 are pivotally mounted to upper edges of the side walls 21, 22 by pivot pins 54, 55 respectively which are connected to suitable brackets 56, 57 extending upwardly from the walls 21, 22. Projecting forwardly from the cross beam 53 is a goose-neck beam portion 60 which has a hitch connection at its forward end connectible to the universal hitch 19. Extending between the cross beam 53 and the forward lower ends of the side walls 21, 22 are hydraulic units 62, 63, controllable from the operator's station on the tractor, which operate to adjust the height of the cutting blade 35 as well as the bowl or scraper 20.

Referring again to the side walls 21, 22 and the associated framework 23, 24, the walls are generally formed to have upper edges comprising substantially horizontally disposed portions 70, 71 respectively extending from rear to front a major part of the length of the side walls 21, 22 to a point short of the front end of the bowl and continuing downwardly inclined portions 72, 73 respectively terminating at forward ends proximate the upper surface of the floor. The frame structures 23, 24 outside the side walls 21, 22 have inclined channel structure, such as at 75, 76, the upper surface of which forms the inclined edge portion 72, 73 of the side walls. The brackets 56, 57 which support the rear end of the beam legs 51, 52 and bracket structures 77, 78 extend upwardly from the edges 72, 73 of the side walls.

A transverse brace or arch member 80 bridges the open forward end of the bowl or body and has a transverse bight portion 81 vertically spaced from the cutting blade 35 and slightly forwardly thereof and a pair of depending leg portions 82, 83, each leg having its lower end fixed, as by welding 84, to the internal surfaces of the side walls 21, 22 and adjacent their lower forward ends. Therefore, the arch 80 operates as transverse support between the side walls 21, 22.

Positioned adjacent the cutting blade 35 and inclined upwardly and rearwardly therefrom is an elevator indicated in its entirety by the reference numeral 90. The elevator 90 extends across and generally closes the open forward end of the scraper bowl. Generally it is inclined at substantially the angle of the edges 72, 73. The elevator is composed of a pair of transversely spaced endless chains 91, 92 having angle iron slats 93 spaced lengthwise along the chains. The chains 91, 92 are mounted over drive sprockets 94, 95 at the upper end of the elevator and over sprockets 96, 97 at the lower end of the elevator. The sprockets 94, 95 are mounted over a common drive shaft 98, opposite ends of which are pivotally mounted on inclined braces or frames 99, 100 respectively. The lower sprockets 96, 97 are mounted to idle over a common shaft 103, the outer ends of which are also carried on the rigid side frames 99, 100. The side frames 99, 100 are rigidly interconnected by a pair of square-sectioned transverse bars 104, 105 at their upper ends, at their middle portions by a transverse crank-shaped bar 106 and at their lower ends by the transverse shaft 103. It may be noted that the transverse bar 106 extends outwardly from the side frames 99, 100 to overlie at its opposite ends the upper edges 72, 73 of the side walls 21, 22 and will limit downward movement of the elevator. Suitable abutment pads or plates 107, 108 are provided on the upper surfaces of the channel members 75, 76 for contact with the outer ends of the bar 106.

The elevator is supported on the scraper bowl or body by means of a pair of rearwardly and downwardly inclined arms 110, 111 which are rigidly connected at their forward ends to the square bars 104, 105. Therefore, the arms 110, 111 may be considered part of an L-shaped elevator frame, the braces 99, 100 serving as one leg of the L, and the arms 110, 111 serving as the other leg of the L. The arms 110, 111 are supported on the super structure 23, 24 of the side walls 21, 22 by means of upwardly extending bracket supports 112, 113 which receive pivot pins 114, 115 extending through the bracket supports 112, 113 and the rearward end of the respective arms 110, 111.

The drive mechanism for operating the elevator chains 91, 92 is shown and described in detail in the present inventors' pending application, Ser. No. 785,203, filed January 6, 1959. Generally it consists of an upright extensible drive shaft 120 which is connected to a suitable drive, not shown, on the tractor, a gear transmission indicated in its entirety by the reference numeral 121 mounted on the side of the forward goose neck beam 60 and a pair of rearwardly extending drive shafts 122, 133 the latter being telescopic and connected at its rear end to a gear transmission 124 which drives the upper drive shaft 98 on the elevator. The various drive shafts are interconnected by universal type joints and are otherwise adjustable so that the entire drive mechanism is suitably articulate to permit various positions of the scraper relative to the tractor and various positions of the elevator on the scraper without effecting the elevator drive. Also, it should be recognized that the drive mechanism will not in any manner effect movement of the elevator relative to the scraper but will automatically re-adjust itself to any movement of the elevator. Other details of the drive is not warranted in the present description. However, if such is desired such may be had by reference to the aforementioned pending application.

Viewing FIGS. 2, 3, and 4, it becomes apparent that in the normal position of the lower end of the elevator, it will be disposed slightly forwardly and above the cutting blade 38 and also generally beneath the bight portion 81 of the arch 80. By providing the arms 110, 111 to be rigid with the frame of the elevator and to be pivotally mounted at their rear ends to the side walls 21, 22, the lower end of the elevator will be permitted a floating action which will rise and fall depending upon the depth of the material passing over the blade 35. However, since the arms 110, 111 are raised with the frame of the elevator, the lower end of the elevator will move about the axis of the pivot pins 114, 115. Thus, should a rather large object such as a tree stump or large stone pass over the blade 35 the lower end of the elevator will rise and be restricted against forward movement so that it will clear or otherwise pass rearwardly of the bight portion 81 of the arch. For this reason, the arch member 80 may be placed on the scraper bowl in a relatively low position where it will not interfere with operation of the scraper or tractor and where it will offer maximum support for the forward ends of the sidewalls.

While only one form of the invention has been shown it should be recognized that other forms and variations will occur to those skilled in the art. Therefore, it should be understood that while the present disclosure was shown and described in detail for purposes of clearly and concisely illustrating the principles of the invention, it was not the intention to limit or narrow the invention beyond the broad concepts set forth in the appended claims.

What is claimed is:

1. In a material carrying scraper, the combination of an elongated horizontally disposed floor having front and rear ends and opposite sides; upright side walls connected respectively to and running lengthwise of the sides of the floor to define with the floor a material-carrying body open at its forward end for receiving material, each side wall having an upper edge comprising a substantially horizontal portion extending from rear to front a major part of the length of the side wall to a point short of the front end of the body and a continuing downwardly inclined portion terminating at a forward end proximate the surface of the floor; a transverse arch member secured to the body adjacent the forward end thereof having a bight and depending legs, each leg having its lower end fixed to the body adjacent one of said forward ends of the inclined portion, and the bight extending transversely across the forward open end of the body, said arch member effecting transverse support to the open end of the body; a transversely disposed cutting blade carried on the body adjacent the forward end of the floor and beneath the arch member; a transversely disposed elevator between the side walls and at the open end of the body and disposed substantially at the angle of said inclined front portions, said elevator having a lower end disposed beneath the arch member and above and in general close proximity to the cutting blade and generally in overlying relationship thereto whereby material moving over the cutting blade will pass between the elevator and blade, said elevator having a rigid elongated frame; and means mounting the elevator on the body comprising outwardly projecting abutments on the lower part of said elevator frame adapted to contact the inclined edge portions of the side walls for limiting downward movement of the lower end of the elevator, downwardly and rearwardly inclined arms rigid with and extending from opposite sides of an upper portion of the elevator frame, and means pivotally mounting the arms on the side walls whereby said elevator may move vertically, said arms being of such length and fixed relative to the elevator frame that upward movement of the lower end of the elevator will be effective to move said lower end clear of said arch member.

2. In a material carrying scraper, the combination of an elongated horizontally disposed floor having front and rear sections; upright side walls running lengthwise of the sides of the floor rigid with opposite edges of the rear section of the floor to define with the floor a material-carrying body open at its forward end for receiving material, each side wall having an upper edge comprising a substantially horizontal portion extending from rear to front a major part of the length of the side wall to a point short of the front end of the body and a continuing downwardly inclined portion terminating at a forward end proximate the surface of the floor and a substantial distance forward of the rear section; means interconnecting the forward section of the floor with the rear section and the side walls whereby the forward section may move from a position forwardly of the rear section to a position whereby said sections overlie one another; a transverse arch member secured to the body adjacent the forward end thereof having a bight bridging the forward open end and depending legs, each leg having its lower end fixed to the body adjacent one of said forward ends of the inclined portions, said arch member thereby effecting transverse support to the open end of the body; a transversely disposed elevator between the side walls and at the open end of the body and disposed substantially at the angle of said inclined front portions, said elevator having a lower end disposed beneath the arch member and above and in general close proximity to the cutting blade and generally in overlying relationship thereto whereby material moving over the cutting blade will pass between the elevator and blade, said elevator having a rigid elongated frame; and means mounting the elevator on the body comprising outwardly projecting abutments on the lower part of said elevator frame adapted to contact the inclined edge portions of the side walls for limiting downward movement of the lower end of the elevator, downwardly and rearwardly inclined arms rigid with and extending from opposite sides of an upper portion of the elevator frame, and means pivotally mounting the arms on the side walls whereby said elevator may move vertically, said arms being of such length and fixed relative to the elevator frame that upward movement of the lower end of the elevator will be effective to move said lower end clear of said arch member.

3. In a material carrying scraper, the combination of an elongated horizontally disposed floor having front and rear sections; upright side walls running lengthwise of the sides of the floor rigid with opposite edges of the rear section of the floor to define with the floor a material-carrying body open at its forward end for receiving material, and extending a substantial distance forward of the rear section; means interconnecting the forward section of the floor with the rear section and the side walls whereby the forward section may move from a position forwardly of the rear section to a position whereby said sections overlie one another; a transverse arch member secured to the body adjacent the forward end thereof having a bight bridging the forward open end and depending legs, each leg having its lower end fixed to a respective side wall adjacent its forward end, said arch member thereby effecting transverse support to the open end of the body; a transversely disposed cutting blade carried on the body adjacent the forward end of the floor and beneath the arch member; a transversely disposed inclined elevator between the side walls and at the open end of the body, said elevator having a lower end disposed beneath the arch member and above and in general close proximity to the cutting blade and generally in overlying relationship thereto whereby material moving over the cutting blade will pass between the elevator and blade, said elevator having a rigid elongated frame; and means mounting the elevator on the body comprising outwardly projecting abutments on the lower part of said elevator frame adapted to contact the side walls for limiting downward movement of the elevator, downwardly and rearwardly inclined arms rigid with and extending from opposite sides of an upper portion of the elevator frame, and means pivotally mounting the arms on the side walls whereby said elevator may move vertically, said arms being of such length and fixed relative to the elevator frame that upward movement of the lower end of the elevator will be effective to move said lower end clear of said arch member.

4. In a material carrying scraper, the combination of an elongated horizontally disposed floor; upright side walls running lengthwise of the sides of the floor to define with the floor a material-carrying body open at its forward end for receiving material; a transverse arch member secured to the body adjacent the forward end thereof having a bight bridging the forward open end and depending legs, each leg having its lower end fixed to a respective side wall adjacent its forward end, said arch member thereby effecting transverse support to the open end of the body; a transversely disposed cutting blade carried on the body adjacent the forward end of the floor and beneath the arch member; a transversely disposed inclined elevator between the side walls and at the open end of the body, said elevator having a lower end disposed beneath the arch member and above and in general close proximity to the cutting blade and generally in overlying relationship thereto whereby material moving over the cutting blade will pass between the elevator and blade, said elevator having a rigid elongated frame; and means mounting the elevator on the body comprising outwardly projecting abutments on the lower part of said elevator frame adapted to contact the side walls for limiting downward movement of the elevator, downwardly and rearwardly inclined arms rigid with and extending from opposite sides of an upper portion of the elevator frame, and means pivotally mounting the arms on the side walls whereby said elevator may move vertically, said arms being of such length and fixed relative to the elevator frame that upward movement of the lower end of the elevator will be effective to move said lower end clear of said arch member.

5. In a material carrying scraper, the combination of an elongated horizontally disposed floor; upright side walls running lengthwise of the sides of the floor to define with the floor a material-carrying body open at its forward end for receiving material; a transverse brace secured to the body adjacent the forward end thereof having opposite ends fixed to the respective side walls adjacent their forward ends and closely spaced from the floor, said brace thereby effecting transverse support to the open end of the body; a transversely disposed cutting blade carried on the body adjacent the forward end of the floor and beneath the brace; a transversely disposed inclined elevator between the side walls and at the open end of the body, said elevator having a lower end disposed beneath the brace and above and in general close proximity to the cutting blade and generally in overlying relationship thereto whereby material moving over the cutting blade will pass between the elevator and blade and beneath the brace, said elevator having a rigid elongated frame; and means mounting the elevator on the body comprising downwardly and rearwardly inclined arms rigid with and extending from opposite sides of an upper portion of the elevator frame, and means pivotally mounting the arms on the side walls whereby said elevator may move vertically, said arms being of such length and fixed relative to the elevator frame that upward movement of the lower end of the elevator will be effective to move said lower end clear of said brace.

6. In a material carrying scraper, the combination of an elongated horizontally disposed floor; upright side walls running lengthwise of the sides of the floor to define with the floor a material-carrying body open at its forward end for receiving material; a rigid transverse yoke beam having opposite leg portions connected to the respective side walls and extending forwardly; a transverse brace secured to the body adjacent the forward end thereof having opposite ends fixed to the respective side walls adjacent their forward ends and closely spaced from the floor, said brace thereby effecting transverse support to the open end of the body; a transversely disposed cutting blade carried on the body adjacent the forward end of the floor and beneath the brace; a transversely disposed inclined elevator between the side walls and at the open end of the body, said elevator having a lower end disposed beneath the brace and above and in general close proximity to the cutting blade and generally in overlying relationship thereto whereby material moving over the cutting blade will pass between the elevator and the blade and beneath the brace, said elevator having a rigid elongated frame; and means mounting the elevator on the body responsive to upward movement of the lower end of the elevator to move said lower end rearwardly and clear of said brace.

7. In a material carrying scraper, the combination of an elongated horizontally disposed floor having front and rear sections; upright side walls running lengthwise of the sides of the floor rigid with opposite edges of the rear section of the floor to define with the floor a material-carrying body open at its forward end for receiving material; a rigid transverse yoke beam having opposite leg portions connected to the respective side walls and extending forwardly; each side wall having an upper edge comprising a substantially horizontal portion extending from rear to front a major part of the length of a side wall to a point short of the front end of the body and a continuing downwardly inclined portion terminating at a forward end proximate the surface of the floor and a substantial distance forward of the rear section; means interconnecting the forward section of the floor with the rear section and sidewalls whereby the forward section may move from a position forwardly of the rear section to a position whereby the sections overlie one another; a transverse arch secured to the body adjacent the forward end thereof having a bight bridging the open end of the body and depending legs, each leg having its lower end fixed to the body adjacent a forward end of an inclined edge portion of a side wall, said arch effecting transverse support to the open end of the body; and a transversely disposed cutting blade carried on the body adjacent the forward end of the floor and beneath the arch whereby material moving over the cutting blade will pass between the arch and blade.

References Cited in the file of this patent

UNITED STATES PATENTS

| | | |
|---|---|---|
| 218,566 | Peek | Aug. 12, 1879 |
| 1,311,338 | Fredson | July 29, 1919 |
| 1,537,558 | Schultz | May 12, 1925 |
| 2,179,532 | Walch | Nov. 14, 1939 |
| 2,464,098 | Pittlick | Mar. 8, 1949 |
| 2,791,041 | Hancock | May 7, 1957 |
| 2,791,044 | Hancock | May 7, 1957 |
| 2,931,451 | Hancock | Apr. 5, 1960 |
| 2,956,353 | Hanner et al. | Oct. 18, 1960 |